United States Patent

Reeves et al.

(10) Patent No.: US 8,683,086 B2
(45) Date of Patent: Mar. 25, 2014

(54) UNIVERSAL REMOTE CONTROL WITH AUTOMATED SETUP

(75) Inventors: Brian Reeves, Hamilton (CA); Richard Pocklington, Burlington (CA)

(73) Assignee: Flextronics AP, LLC., Broomfield, CO (US)

( * ) Notice: Subject to any disclaimer, the term of this patent is extended or adjusted under 35 U.S.C. 154(b) by 9 days.

(21) Appl. No.: 12/948,585

(22) Filed: Nov. 17, 2010

(65) Prior Publication Data

US 2012/0124245 A1 May 17, 2012

(51) Int. Cl.
*G06F 3/00* (2006.01)
*G06F 3/048* (2013.01)
*G06F 9/24* (2006.01)
*G06F 15/177* (2006.01)

(52) U.S. Cl.
USPC ............ 710/8; 710/10; 710/62; 713/1; 713/2; 715/700; 715/762; 715/763; 715/765

(58) Field of Classification Search
None
See application file for complete search history.

(56) References Cited

U.S. PATENT DOCUMENTS

| | | | | |
|---|---|---|---|---|
| 6,225,938 B1 * | 5/2001 | Hayes et al. | ........... | 341/176 |
| 6,865,719 B1 * | 3/2005 | Nicholas, III | ........... | 715/856 |
| 7,755,643 B2 * | 7/2010 | Kramer et al. | ........... | 345/619 |
| 7,813,822 B1 * | 10/2010 | Hoffberg | ........... | 700/94 |
| 7,966,577 B2 * | 6/2011 | Chaudhri et al. | ........... | 715/835 |
| 8,102,678 B2 | 1/2012 | Jungreis | | |
| 8,160,564 B1 * | 4/2012 | Gunasekara et al. | ........... | 455/419 |
| 8,266,550 B1 * | 9/2012 | Cleron et al. | ........... | 715/863 |
| 2007/0279244 A1 * | 12/2007 | Haughawout et al. | ........... | 340/825.22 |
| 2008/0013477 A1 * | 1/2008 | Claussen et al. | ........... | 370/328 |
| 2008/0165260 A1 * | 7/2008 | Narayanaswami | ........... | 348/231.3 |
| 2008/0184139 A1 * | 7/2008 | Stewart et al. | ........... | 715/762 |
| 2009/0298469 A1 * | 12/2009 | Kim et al. | ........... | 455/411 |
| 2010/0005160 A1 * | 1/2010 | Sparks | ........... | 709/222 |
| 2010/0081375 A1 * | 4/2010 | Rosenblatt et al. | ........... | 455/41.1 |
| 2010/0257469 A1 * | 10/2010 | Kim et al. | ........... | 715/763 |
| 2010/0269048 A1 * | 10/2010 | Pahlavan et al. | ........... | 715/740 |
| 2010/0293462 A1 * | 11/2010 | Bull et al. | ........... | 715/716 |

* cited by examiner

*Primary Examiner* — Michael Sun
(74) *Attorney, Agent, or Firm* — Haverstock & Owens LLP

(57) ABSTRACT

A remote control of the present invention automatically identifies one or more peripheral devices which need to be programmed with the remote control. In some embodiments, the remote control is able to visually identify a peripheral device from an image, obtain the configuration information for the peripheral device, and program itself in the background according to the configuration information. These tasks are advantageously performed by the remote control, without user input. The remote control can be programmed to support a plurality of peripheral devices. When the remote control is used to control a peripheral device, the remote control will first present a selection list on the display screen. The selection list includes all the peripheral devices that the remote is communicatively coupled with. Upon the user selecting the desired peripheral device to be controlled, the remote control dynamically outputs a customized user interface associated with the selected peripheral device.

15 Claims, 5 Drawing Sheets

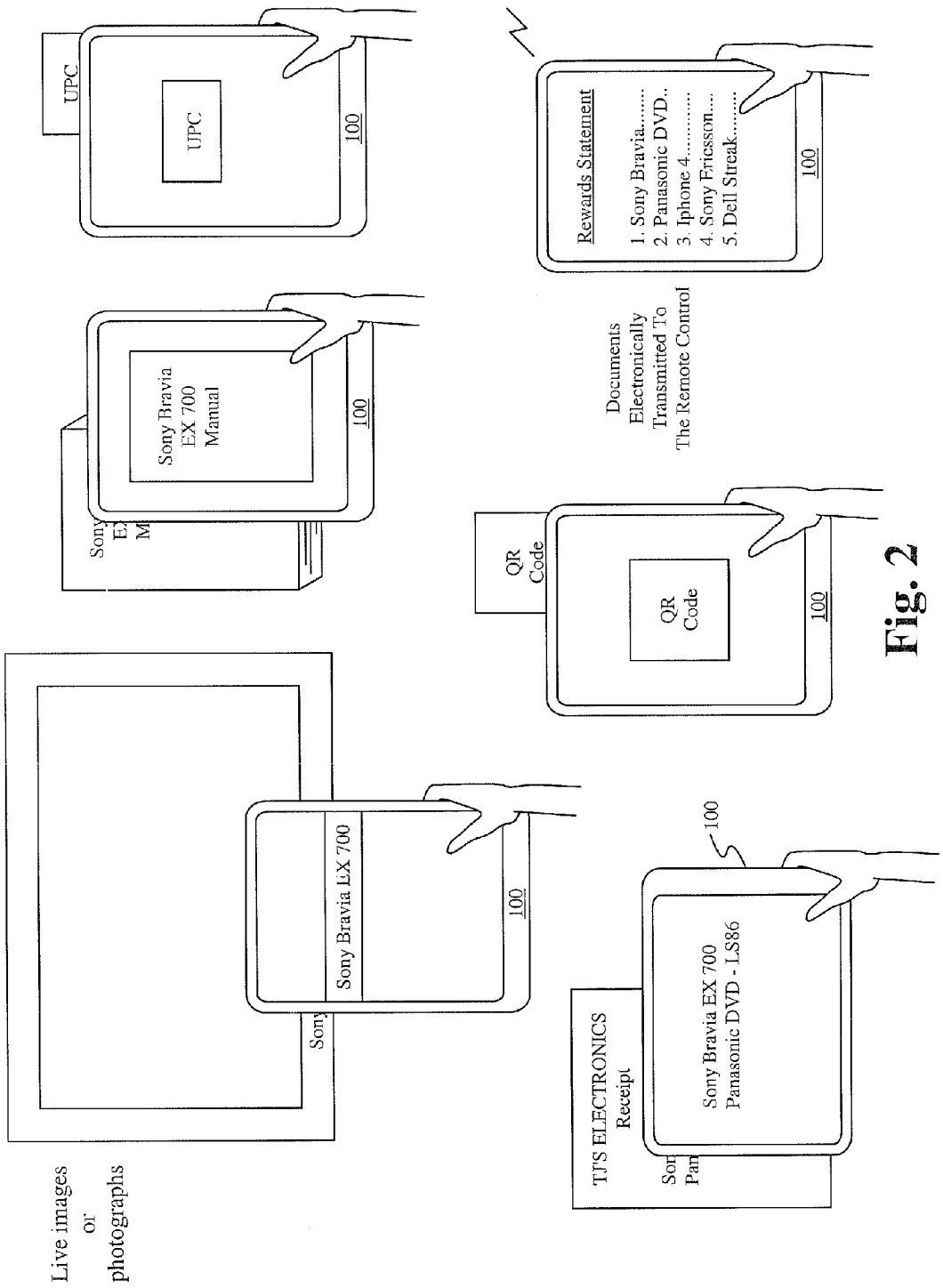

UNIVERSAL REMOTE CONTROL WITH AUTOMATED SETUP

FIELD OF THE INVENTION

The present invention relates to universal remote controls. More particularly, the present invention relates to a universal remote control with automated setup.

BACKGROUND OF THE INVENTION

We live in a technological world with a vast, and ever increasing, number of electronic devices. Electronic devices are oftentimes complex to configure and use, and may be sold with remotes to operate these electronic devices. As electronic devices, such as consumer media, become more complicated, the need for a relatively simple user interface to aid in their configuration and setup becomes more important. Furthermore, as the number of remotes a user comes to own increases, the need to help the user manage these remotes becomes more important.

Currently, a prior art master controller can be programmed to control a plurality of consumer electronic devices. However, programming the master controller for a consumer electronic device is a fairly complex procedure. And, as such, a tech-savvy individual typically programs the master controller, although a non-technical individual can operate the master controller after it has been programmed. Even when a tech-savvy individual programs the master controller, the procedure is still troublesome and time consuming. For example, the tech-savvy individual must correctly identify the type of device to be controlled and manually input this information into the master controller or select the type of device from a list before proceeding. The tech-savvy individual may need to perform additional steps before the master controller is able to properly control the device. What is needed is a remote and a method to automatically set up the remote to support a plurality of devices.

SUMMARY OF THE INVENTION

Embodiments of the present invention are directed towards a universal remote control with automated setup. The universal remote control is able to visually identify a peripheral device from an image, obtain configuration information for the peripheral device from an internal or external source, and program itself typically in the background, transparent to the user, according to the configuration information. These tasks, which are prone to human error and are troublesome, are advantageously performed by the universal remote control, with little or no user input or interaction. The universal remote control can be programmed to support a plurality of peripheral devices.

In one aspect, a controller includes means for automatically configuring the controller based on configuration information of an electronic device such that the controller is capable of communicating with the electronic device. The means for automatically configuring the controller includes means for automatically identifying the electronic device from an image, and means for accessing the configuration information of the electronic device identified from the image. Typically, the controller is configured to set up in the background without user input. The controller also includes means for displaying functional elements associated with the electronic device. The functional elements include touch screen icons. In some embodiments, the controller further includes means for rearranging the functional elements.

In another aspect, a handheld device is configured to communicatively couple to at least one peripheral device. The handheld device includes a processor and at least one application executed by the processor. The application is able to use configuration information of a peripheral device and generate a user interface for operating the peripheral device based on the configuration information. Typically, when generating a user interface, a selection list that includes the peripheral device is generated, and the handheld device thereafter detects the peripheral device as a selected device to be controlled. The user interface is typically specific to the peripheral device. In some embodiments, the user interface includes a dial, navigation buttons, a number pad, a volume control, a power button, or a combination thereof.

In some embodiments, the peripheral device is identified from an image. In some embodiments, the handheld device further includes a camera configured to obtain the image.

In some embodiments, the handheld device includes an IR transmitter and the at least one peripheral device includes an IR receiver. The handheld device is communicatively coupled with the at least one peripheral device using IR. Alternatively or in addition to, the handheld device includes a RF transmitter and the at least one peripheral device includes a RF receiver. The handheld device is communicatively coupled with the at least one peripheral device using RF. Alternatively or in addition to, the handheld device and the at least one peripheral device are Ethernet-enabled. The handheld device is communicatively coupled with the at least one peripheral device over WiFi or LAN.

In some embodiments, the configuration information is internally stored within the handheld device. The configuration information is updated periodically or on-demand. Alternatively or in addition to, the configuration information is remotely stored outside the handheld device.

In yet another aspect, using a remote control includes determining a peripheral device to be controlled. In some embodiments, the peripheral device to be controlled is identified from an image. An image can be a photograph or is a live image of a part of the peripheral device. For example, a part of the peripheral device is a model code on the face or an identity plate of the peripheral device. An image can also be a document containing identification data regarding the peripheral device. For example, a document is a receipt, a credit card statement, a loyalty card statement, or a rewards card statement. The document can be received over a network or at a point of sale.

Configuration information of the peripheral device is used to automatically configure the remote control and to dynamically display an operative menu to control the peripheral device upon detecting the peripheral device as a selected device to be controlled.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

FIG. 2 illustrates exemplary techniques of obtaining an image in accordance with the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed towards a universal remote control with automated setup. The universal remote control is able to automatically identify one or more peripheral devices which need to be programmed with the universal remote control. The universal remote control is able to visually identify a peripheral device from an image, obtain configuration information for the peripheral device from an internal or external source, and program itself typically in the background, transparent to the user, according to the configuration information. These tasks, which are prone to human error and are troublesome, are advantageously performed by the universal remote control, with little or no user input or interaction. The universal remote control can be programmed to support a plurality of peripheral devices. Embodiments of the present invention also advantageously reduce the number of components sold with each electronic device (e.g., peripheral device sold without a remote control), thereby minimizing the environmental impact of e-waste, and reducing overall production cost and/or consumer cost.

Figure 1A:
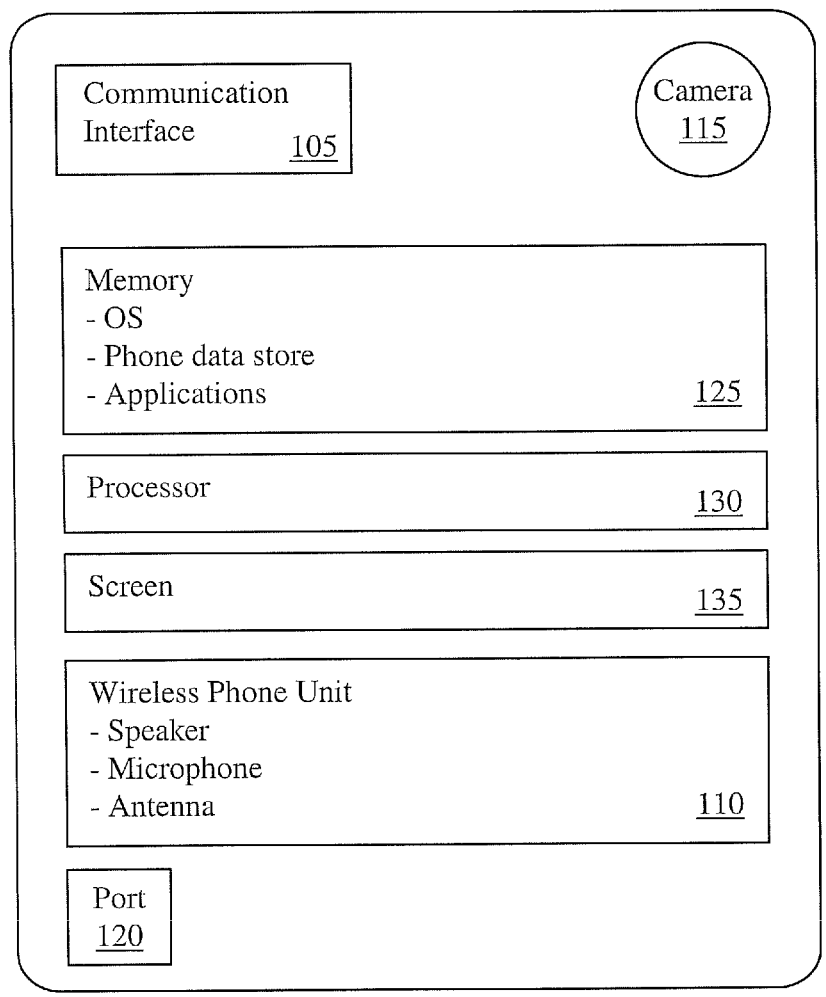
FIG. 1A illustrates a graphical representation of an exemplary universal remote control in accordance with the present invention.

In some embodiments, the universal remote control is a handheld device, such as a smartphone, which has computing ability. FIG. 1A illustrates a graphical representation of an exemplary universal remote control 100 in accordance with the present invention. The universal remote control 100 is able to store, serve, compute, communicate and/or display information to enable a user to control one or more peripheral devices. The universal remote control 100 typically has an advanced processor 130 and abundant memory 125 to support at least an operating system, data stores and applications. The universal remote control 100 also has one or more communication interfaces 105 and a display screen 135. The communication interfaces 105 include an infrared (IR) interface, a radio frequency (RF) interface, and/or an Ethernet interface. The display screen 135 can be a capacitive touchscreen or a resistive touchscreen. The universal remote control 100 can also include and support other hardware components, such as a wireless phone unit 110, having a speaker, microphone and antenna, for sending/receiving voice and/or data, a camera 115, and a port 120 to couple with or to receive an external storage device. In some embodiments, the port 120 is a USB port or a proprietary port. Although only one port is illustrated, the universal remote control 100 can have a plurality of ports.

Figure 1B:
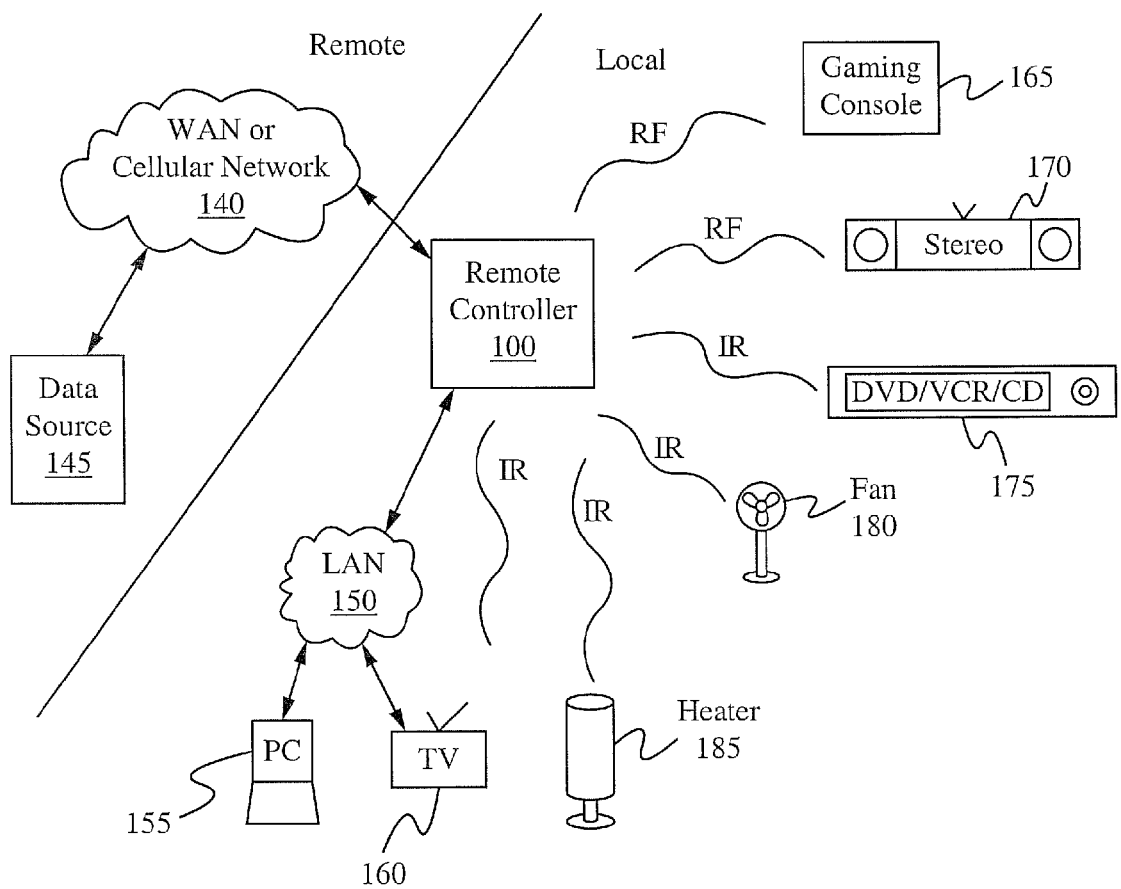
FIG. 1B illustrates exemplary peripheral devices communicatively coupled with the universal remote control in accordance with the present invention.

Depending on the capabilities of a peripheral device, the universal remote control 100 is able to communicate with the peripheral device through the one or more communication interfaces 105 using infrared, radio frequency such as Bluetooth™, Ethernet, or a combination thereof. As illustrated in FIG. 1B, the one or more peripheral devices include, but not limited to, a PC 155, a gaming console 165, a stereo 170, a DVD/CD/VCR player 175, a fan 180, a heater 185, a TV 160, and other electronic devices (not shown) which are capable of being controlled. In FIG. 1B, the universal remote control 100 is configured to communicatively couple with the PC 155 and the TV 160 either wired or wirelessly (WiFi) over a LAN 150. The universal remote control 100 is configured to communicatively couple with the gaming console 165 and the stereo 170 using RF. And, the universal remote control 100 is configured to communicatively couple with the DVD/CD/VCR player 175, the fan 180, the heater 185 and the TV 160 using IR. Each peripheral device communicatively has a primary or preferred communication mode. Some peripheral devices have alternative communication modes.

In some embodiments, if a primary communication mode of a peripheral device is nonfunctional, then a secondary communication mode can be used such that the universal remote control 100 is still able to communicatively couple with the peripheral device. For example, in the event that the universal remote control 100 fails to communicatively couple with the TV 160 using IR, the universal remote control 100 is able to communicatively couple with the TV 160 over the LAN 150.

The universal remote control 100 of the present invention is able to visually identify a peripheral device to be controlled or supported by the universal remote control 100. In particular, the universal remote control 100 first obtains an image and thereafter identifies the peripheral device from the image.

In some embodiments, the image can be a live image sensed by the camera 115 of the universal remote control 100 or a photograph (such as one that is captured by the camera 115 of the universal remote control 100). The image typically includes a part of the peripheral device that is able to assist the universal remote control 100 in identifying of the peripheral device. For example, the part of the peripheral device is a QR (quick response) code, a UPC (universal product code), a SKU (stock-keeping unit) code, or a model code on the face of the peripheral device or on the manual, or an identity plate of the peripheral device. Alternatively, the image can be a document electronically transmitted to and received by the universal remote control 100, for example, over a network 140, 150 from data source 145 or at a point of sale. For example, the document is a receipt, a credit card statement, a loyalty card statement, a rewards card statement, or other customer records stored by retailers/distributors which can be used to identify the peripheral device that the user wishes to program for use with the universal remote control 100. In some embodiments, the user is able to provide the universal remote control 100 a document by coupling an external storage device with the universal remote control 100 via the port 120 for retrieval of the document from the external storage device. The document can belong to the user or someone else who had purchased the peripheral device, as long as the document is able to assist the universal remote control 100 in identifying the peripheral device. The universal remote control 100 is able to scan the image, regardless of its format and how it was obtained, and thereafter visually identify from the image what the peripheral device is using image recognition techniques.

FIG. 2 illustrates exemplary techniques of obtaining an image in accordance with the present invention. As discussed above, the image can be a live image, a photograph, or a document electronically transmitted to the universal remote control 100. Identification of the peripheral device is then extracted from the image using image recognition techniques. Typically, software implementing the image recognition technique is stored on the universal remote control 100. In some embodiments, the universal remote control 100 is able to identify more than one peripheral device from the image.

Typically, successful identification of a peripheral device includes determining the make and model of the peripheral device.

If more than one peripheral device had been identified from the image, the user is prompted to select one or more peripheral devices the user wishes to be programmed with the universal remote control 100. Alternatively, all of the identified peripheral devices will be programmed with the universal remote control 100. In the event that identification has failed, the user may be prompted to try again or is given the opportunity to manually program the universal remote control 100.

After successfully identifying a peripheral device from the image, the universal remote control 100 automatically obtains configuration information of the identified peripheral device. The configuration information not only allows for the universal remote control 100 to be programmed such that the universal remote control 100 is operatively coupled with the peripheral device, but the configuration information also determines the graphical layout of a customized user interface associated with the peripheral device to be displayed on the screen 135 (FIG. 1A).

In some embodiments, configuration information of an identified peripheral device is obtained from an external data source, such as a networked data source 145 (FIG. 1B). Typically, the networked data source 145 is coupled to the network 140 and stores a code list, which includes the configuration information of the peripheral device. The networked data source 145 can be at a central web location where configuration data for all electronic devices are stored, or can be at the manufacturer's web location.

Alternatively, the external data source is an external storage device (not illustrated) coupled to the universal remote control 100 via port 120. The external storage device stores a code list, which includes the configuration data for a plurality of electronic devices, including the configuration information of the peripheral device. The code list on the external storage device may be updated periodically or on-demand with configuration data to support new electronic devices. In these cases where configuration data is stored in the networked data source 145 or an external storage device, the configuration information of the peripheral device is obtained remotely from the networked data source 145 or the external storage device, respectively. An advantage with these external retrieval configurations is that the universal remote control 100 need not store configuration data for other electronic devices not yet operatively coupled with the universal remote control 100. Since memory on the universal remote control 100 is a commodity, only the required configuration data is stored, thereby utilizing only a portion of the memory necessary to support the peripheral device(s).

Alternatively, configuration information of the peripheral device is already stored internally in the universal remote control 100. The universal remote control 100 may locally store a code list, which includes the configuration data for a plurality of electronic devices. The code list is typically locally stored in the memory 125 of the universal remote control 100. The code list on the universal remote control 100 may be updated periodically or on-demand. In this case where configuration data is stored in the universal remote control 100, the configuration information of the peripheral device is obtained locally from the universal remote 100. An advantage with this configuration is in the instance where the network 140 is unavailable; the universal remote control 100 can still be programmed since the configuration information is obtained locally from the universal remote control 100.

In some embodiments, the universal remote control 100 will first check its local memory 125, then the coupled external data source, if any, and lastly the networked data source 145, for the configuration information of the peripheral device.

After successfully obtaining the configuration information of the peripheral device, the universal remote control 100 automatically sets up (programs) itself based on the configuration information such that the universal remote control 100 is capable of communicating with the peripheral device. Typically, the configuration takes place in the background, without any or further user input or interaction. During configuration, the user is able to continue to use the universal remote control 100 to, for example, play a game, surf the Internet, or make a phone call, without disrupting the programming process. When the universal remote control 100 is successfully programmed, the universal remote control 100 will alert the user that the programming is completed and that the universal remote control 100 is now communicatively coupled with the peripheral device. Typically, the universal remote control 100 is able to be communicatively coupled with a plurality of peripheral devices simultaneously.

In the event that a plurality of peripheral devices are identified from a single image, the universal remote control 100 will finish obtaining configuration data for all of the requested peripheral devices before sequentially programming itself for each peripheral device according to the corresponding configuration information. Alternatively, the universal remote control 100 will obtain configuration data for a first requested peripheral device and program itself accordingly before repeating these steps for the next requested peripheral device. Similar to the programming for a single peripheral device, the user is able to use the universal remote control 100 without disrupting the programming process.

In some embodiments, when the universal remote control 100 is used as a remote, the universal remote control 100 will first present a selection list on the display screen 135. The selection list includes all the peripheral devices that the universal remote control 100 is supporting (e.g., communicatively coupled with). Upon the user selecting the desired peripheral device to be controlled, the universal remote control 100 dynamically outputs a customized user interface associated with the selected peripheral device. The user interface can include a dial, a slider, navigation buttons, a number pad, a volume controller, a peripheral device power button, a mute button, a menu button, and/or other virtual controllers for interacting with and controlling the peripheral device. The user interface can also include a voice recognition feature that allows the user to simply say a command to control the peripheral device.

Figure 3:
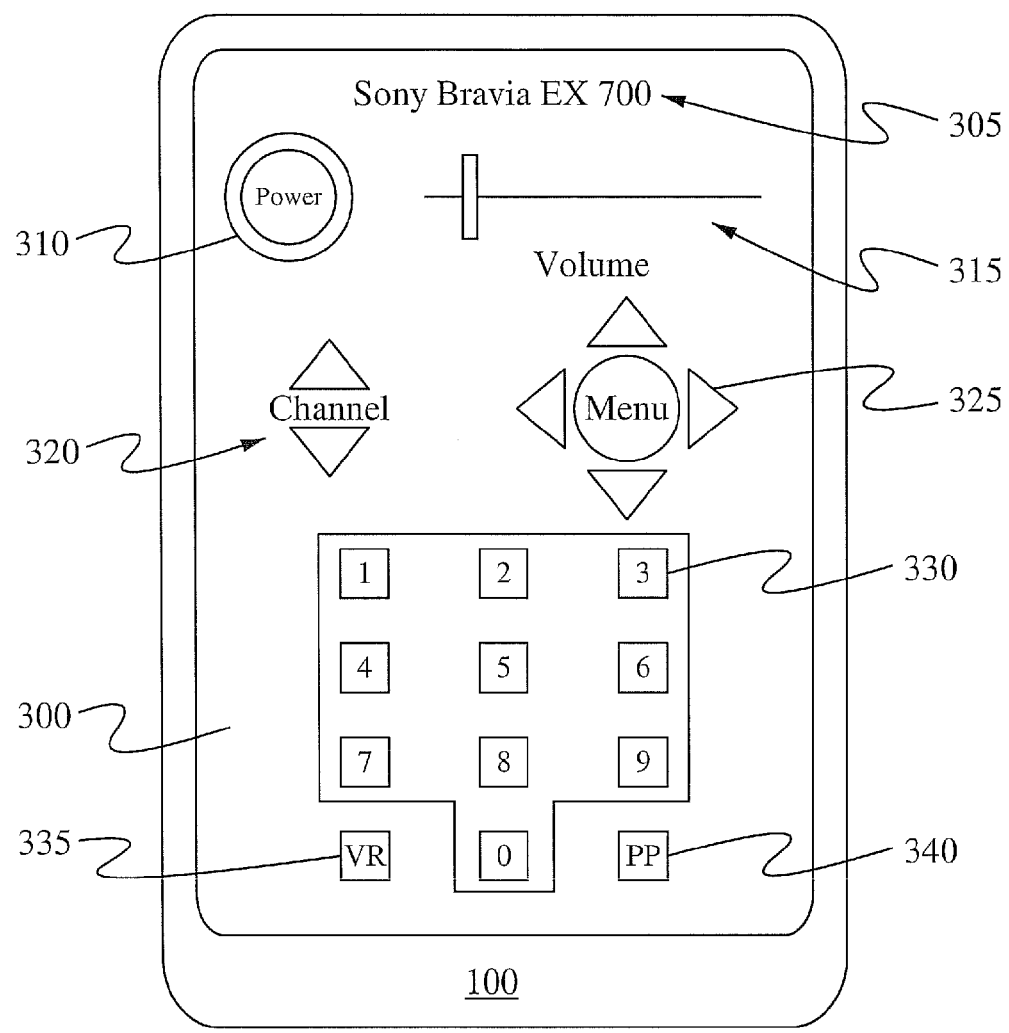
FIG. 3 illustrates an exemplary customized user interface in accordance with the present invention.

FIG. 3 illustrates an exemplary customized user interface 300 for the Sony Bravia EX700 peripheral device. As illustrated, the user interface 300 displays a description 305 of the peripheral device, such as the make and model, a power button 310, a slider 315 to adjust the volume, navigation buttons for channel selection 320, menu and associated navigation buttons for the menu 325, a number pad 330, a voice recognition button 335, and a picture-in-picture button 340. Upon receiving user input via the customized user interface 300, the universal remote control 100 controls the peripheral device accordingly.

In some embodiments, when the number of virtual controllers for a peripheral device is too many for all the virtual controllers be displayed on one screen "page," the virtual controllers can be displayed over a plurality of screen pages such that only a subset of the virtual controllers is displayed on each page. The user is able to scroll between the pages to view the virtual controllers. In other embodiments, the user is able to expand a page such that the virtual controllers on that page are relatively large in size, which is particularly useful for the vision-impaired. The user is able to scroll up/down, left/right on the page. Yet in other embodiments, the user is able to further personalize the user interface for the peripheral device by rearranging the virtual controllers on a page or on multiple pages. The user is able to save the setting and, at any time thereafter, revert back to the original (default) customized user interface for that peripheral device.

Figure 4:
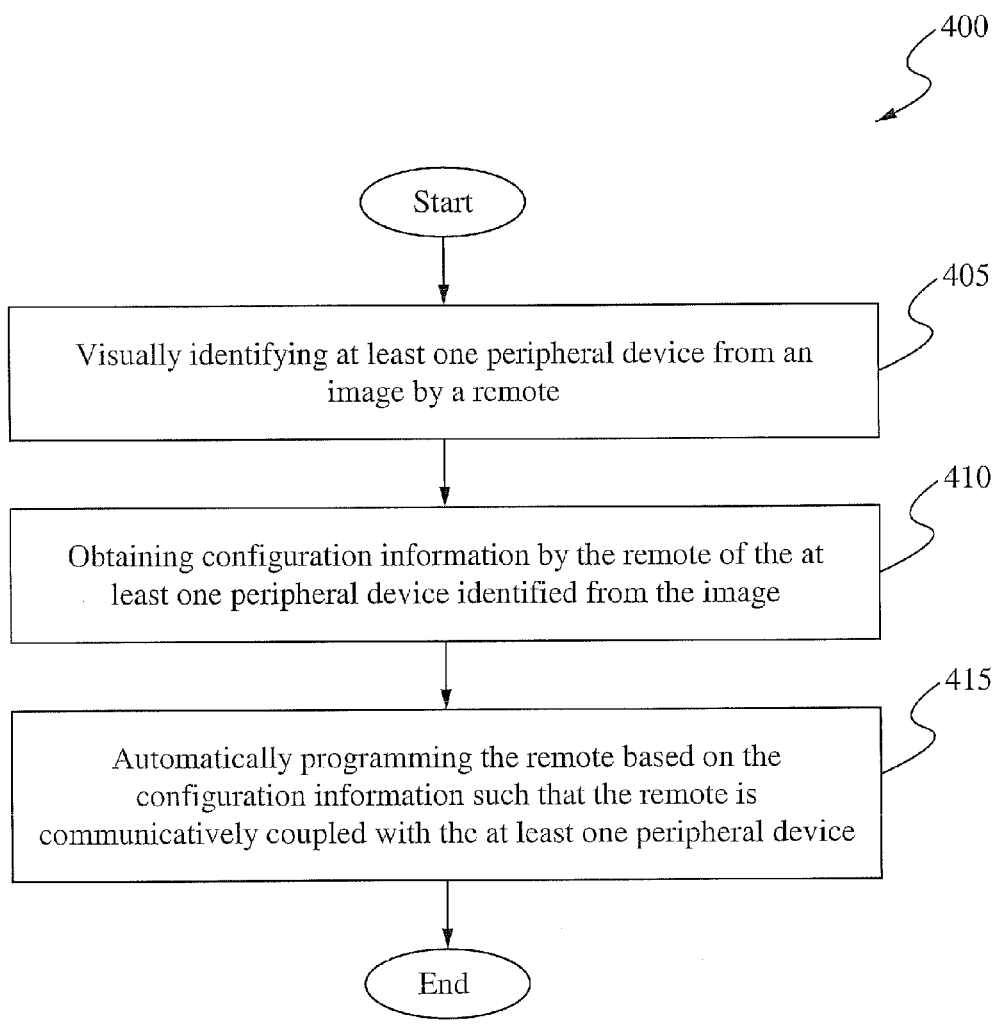
FIG. 4 illustrates an exemplary process of configuring an universal remote control in accordance with the present invention.

FIG. 4 illustrates an exemplary process 400 of configuring the universal remote control 100 in accordance with the present invention. At a step 405, at least one peripheral device from an image is visually identified by the universal remote control. In particular, the universal remote control 100 first obtains the image and thereafter identifies the peripheral device(s) from the image. As discussed above, the image can be a live image, a photograph or a document obtained by the universal remote control 100.

After successfully identifying the peripheral device from the image, configuration information of the peripheral device identified from the image is obtained, at a step 410. Configuration information of the peripheral device can be obtained locally from within the universal remote control 100 itself or remotely (e.g., from a networked data source 145 or an external storage device coupled to the universal remote control 100).

At a step 415, the universal remote control 100 is automatically programmed based on the obtained configuration information such that the universal remote control 100 is communicatively coupled with the peripheral device. According to the process 400, the user need not identify the type of peripheral device the user wishes to control or manually input configuration information into the universal remote control 100 or select an item from a list or menu. In fact, after an image is obtained by the universal remote control 100, the programming of the universal remote control 100 is automatic.

It is contemplated that peripheral devices include smart home appliances. Accordingly, the universal remote control of the present invention is also able to work with and/or support an intelligent home system. For example, the universal remote control can be programmed to control smart home appliances, such as an air conditioning unit, in addition to common consumer electronic devices including those mentioned above.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A controller comprising:
a. means for automatically configuring the controller based on configuration information of an electronic device such that the controller is configured for communicating with the electronic device, wherein the means for automatically configuring the controller includes means for automatically identifying the electronic device from an image, and means for accessing the configuration information of the electronic device identified from the image;
b. means for displaying functional elements for communicating with the electronic device; and
c. means for rearranging the functional elements in a plurality of ways comprising resizing the functional elements, wherein the means for rearranging the functional elements is configured for controlling the electronic device.

2. The controller of claim 1, wherein the controller is configured to set up in the background without user input.

3. The controller of claim 1, wherein the functional elements include touch screen icons.

4. A handheld device configured to communicatively couple to at least one peripheral device, the handheld device comprising:
a. a processor; and
b. at least one application executed by the processor, the at least one application for:
using configuration information of a peripheral device, wherein using the configuration information includes automatically identifying the peripheral device from an image and assessing the configuration information of the peripheral device identified from the image;
generating a user interface for operating the peripheral device, the user interface being specific to the peripheral device and comprising functional elements configured for operating the peripheral device; and
rearranging the functional elements in a plurality of ways comprising resizing the functional elements.

5. The handheld device of claim 4, wherein the handheld device comprises an IR transmitter and the at least one peripheral device comprises an IR receiver, and wherein the handheld device is communicatively coupled with the at least one peripheral device using IR.

6. The handheld device of claim 4, wherein the handheld device comprises a RF transmitter and the at least one peripheral device comprises a RF receiver, and wherein the handheld device is communicatively coupled with the at least one peripheral device using RF.

7. The handheld device of claim 4, wherein the handheld device and the at least one peripheral device are Ethernet-enabled, and wherein the handheld device is communicatively coupled with the at least one peripheral device over WiFi or LAN.

8. The handheld device of claim 4, further comprising a camera configured to obtain the image.

9. The handheld device of claim 4, wherein the user interface includes a dial, navigation buttons, a number pad, a volume control, a power button, or a combination thereof.

10. The handheld device of claim 4, wherein the configuration information is internally stored within the handheld device.

11. The handheld device of claim 10, wherein the configuration information is updated periodically or on-demand.

12. The handheld device of claim 4, wherein the configuration information is remotely stored outside the handheld device.

13. The handheld device of claim 4, wherein the generating a user interface comprises presenting a selection list from which the peripheral device is selected, and detecting the peripheral device as a selected device to be controlled.

14. A method of using a remote control comprising:
a. determining a peripheral device to be controlled, wherein the determining a peripheral device comprises:
receiving an image over a network or at a point of sale, wherein the image is a document containing human-readable identification data regarding the peripheral device, and
identifying the peripheral device from the identification data to automatically determine configuration information of the peripheral device and assessing the configuration information of the peripheral device identified from the image; and b. using the configuration information of the peripheral device to:

automatically configure the remote control; and dynamically display an operative menu to control the peripheral device upon detecting the peripheral device as a selected device to be controlled.

15. The method of claim 14, wherein the document is a receipt, a credit card statement, a loyalty card statement, or a rewards card statement.

\* \* \* \* \*